(12) United States Patent
Nayhouse et al.

(10) Patent No.: US 11,960,292 B2
(45) Date of Patent: Apr. 16, 2024

(54) METHOD AND SYSTEM FOR DEVELOPING AUTONOMOUS VEHICLE TRAINING SIMULATIONS

(71) Applicant: Argo AI, LLC, Pittsburgh, PA (US)

(72) Inventors: Michael Nayhouse, Pittsburgh, PA (US); Michael Pacilio, Pittsburgh, PA (US); Thomas Carl Ackenhausen, Ann Arbor, MI (US); Allen Edward Flick, Pittsburgh, PA (US)

(73) Assignee: Argo AI, LLC, Pittsburgh, PA (US)

( * ) Notice: Subject to any disclaimer, the term of this patent is extended or adjusted under 35 U.S.C. 154(b) by 134 days.

(21) Appl. No.: 17/387,927

(22) Filed: Jul. 28, 2021

(65) Prior Publication Data
US 2023/0037142 A1    Feb. 2, 2023

(51) Int. Cl.
*B60W 30/095* (2012.01)
*B60W 30/18* (2012.01)
*G05D 1/00* (2024.01)

(52) U.S. Cl.
CPC ......... *G05D 1/0221* (2013.01); *B60W 30/095* (2013.01); *B60W 30/18163* (2013.01);
(Continued)

(58) Field of Classification Search
CPC ......... B60W 30/095; B60W 30/18163; B60W 2420/403; B60W 2420/52; B60W 60/001;
(Continued)

(56) References Cited

U.S. PATENT DOCUMENTS 11,030,364 B2   6/2021   Sholingar et al.
11,364,927 B2   6/2022   Wolff
(Continued)

FOREIGN PATENT DOCUMENTS

DE   102019211009 A1   1/2021
WO   2019199880 A1   10/2019
WO   2021183748 A1   9/2021

OTHER PUBLICATIONS

Behavioral Pedestrian Tracking Using a Camera and LiDAR Sensors on a Moving Vehicle (Year: 2019).*
(Continued)

*Primary Examiner* — Thomas Ingram
*Assistant Examiner* — Faris Asim Shaikh
(74) *Attorney, Agent, or Firm* — Fox Rothschild LLP

(57) ABSTRACT

Method and systems for generating vehicle motion planning model simulation scenarios are disclosed. The system receives a base simulation scenario with features of a scene through which a vehicle may travel. The system then generates an augmentation element with a simulated behavior for an object in the scene by: (i) accessing a data store in which behavior probabilities are mapped to object types to retrieve a set of behavior probabilities for the object; and (ii) applying a randomization function to the behavior probabilities to select the simulated behavior for the object. The system will add the augmentation element to the base simulation scenario at the interaction zone to yield an augmented simulation scenario. The system will then apply the augmented simulation scenario to an autonomous vehicle motion planning model to train the motion planning model.

20 Claims, 9 Drawing Sheets

(52) U.S. Cl.
CPC ......... *G05D 1/0044* (2013.01); *G05D 1/0088* (2013.01); *G05D 1/0219* (2013.01); *G05D 1/0238* (2013.01); *B60W 2420/403* (2013.01); *B60W 2420/408* (2024.01)

(58) Field of Classification Search
CPC .. G05D 1/0221; G05D 1/0044; G05D 1/0088; G05D 1/0219; G05D 1/0238; G05D 1/0038; G05D 1/02; G05D 1/0212; G05D 1/0214; G05D 1/021; G05D 2201/0213; G09B 9/00; G09B 9/006; G09B 9/02; G09B 9/04; G09B 9/042; G06N 3/09; G06N 3/091; G06N 3/092; G06N 3/094; G06N 3/096; G06N 3/098; G06N 3/0985; G06N 3/08; G06N 3/088; G06N 3/086; G06N 3/084; G06N 3/082; G06N 3/0895; G06N 7/01; G06N 20/10; G06N 3/045; G06N 3/0464; G06N 3/047; G06N 3/049; G06N 3/0475; G06N 3/048; G06N 3/0409; G06N 3/043; G06T 2207/20084; G06T 2207/20081; G06V 20/58; G06V 20/588; G06V 20/56; G06V 20/10; G06V 20/176; G06V 10/40; G06V 10/70; G06V 20/80; G06V 40/10; G06V 10/76; G06V 10/766; G06V 10/768; G06V 10/765; G06V 20/00; G06F 18/2163
See application file for complete search history.

(56) References Cited

U.S. PATENT DOCUMENTS

| | | | |
|---|---|---|---|
| 2008/0065328 A1* | 3/2008 | Eidehall | G01S 7/295 |
| | | | 701/301 |
| 2014/0035775 A1* | 2/2014 | Zeng | G06F 18/253 |
| | | | 342/52 |
| 2016/0059855 A1 | 3/2016 | Rebhan et al. | |
| 2016/0101779 A1* | 4/2016 | Katoh | B60W 30/095 |
| | | | 340/435 |
| 2017/0132334 A1* | 5/2017 | Levinson | G01S 17/931 |
| 2017/0329332 A1* | 11/2017 | Pilarski | B60W 30/095 |
| 2018/0046931 A1 | 2/2018 | Bagherpour | |
| 2019/0042679 A1 | 2/2019 | Stefan et al. | |
| 2019/0129831 A1 | 5/2019 | Goldberg | |
| 2019/0317219 A1* | 10/2019 | Smith | G05D 1/024 |
| 2020/0074230 A1 | 3/2020 | Englard et al. | |
| 2020/0192393 A1 | 6/2020 | Aragon | |
| 2020/0249677 A1* | 8/2020 | Maat | G05D 1/0212 |
| 2020/0250363 A1* | 8/2020 | Partridge | G06F 30/20 |
| 2020/0327313 A1* | 10/2020 | Kedarisetti | G06V 20/40 |
| 2020/0353943 A1* | 11/2020 | Siddiqui | G06N 3/045 |
| 2020/0363800 A1* | 11/2020 | Jojo-Verge | B60W 60/0011 |
| 2020/0377090 A1 | 12/2020 | Seccamonte et al. | |
| 2020/0409369 A1* | 12/2020 | Zaytsev | G05D 1/0212 |
| 2021/0094540 A1* | 4/2021 | Bagschik | G06F 11/3013 |
| 2021/0096264 A1* | 4/2021 | Bosse | G05D 1/0231 |
| 2021/0096571 A1* | 4/2021 | Modalavalasa | G06V 20/56 |
| 2021/0149404 A1* | 5/2021 | Zeng | G06V 20/58 |
| 2021/0157882 A1 | 5/2021 | Liu et al. | |
| 2021/0179124 A1* | 6/2021 | Hollander | G06F 11/3664 |
| 2021/0300412 A1* | 9/2021 | Dingli | B60W 50/0098 |
| 2021/0380142 A1 | 12/2021 | Ramamoorthy et al. | |
| 2021/0403035 A1* | 12/2021 | Danna | B60W 60/0011 |
| 2022/0012388 A1* | 1/2022 | Wyrwas | G07C 5/008 |
| 2022/0035375 A1* | 2/2022 | Rezaee | G05B 13/027 |
| 2022/0063664 A1* | 3/2022 | Liu | G08G 1/09626 |
| 2022/0153298 A1* | 5/2022 | Wang | G06N 20/00 |
| 2022/0156614 A1* | 5/2022 | Dalli | G06N 20/00 |
| 2022/0185323 A1* | 6/2022 | Dolben | B60W 60/0011 |
| 2022/0237410 A1* | 7/2022 | Wrenninge | G06F 18/214 |

OTHER PUBLICATIONS

Beck J.L. et al., "Rare-Event Simulation", (2017) In: Ghanem R., Higdon D., Owhadi H. (eds) Handbook of Uncertainty Quantification. Springer, Cham. https://doi.org/10.1007/978-3-319-12385-1_24.

Li, W. et al., "AADS: Augmented autonomous driving simulation using data-driven algorithms", (Mar. 27, 2019) Science Robotics, 4(28), eaaw0863.

Information about Related Patents and Patent Applications, see section 4 of the accompanying Information Disclosure Statement Letter, which concerns Related Patents and Patent Applications.

Yurtsever, E. et al., A Survey of Autonomous Driving: Common Practices and Emerging Technologies, IEEE Access, vol. 8, Mar. 22, 2020.

Gonzalez, D. et al., A Review of Motion Planning Techniques for Automated Vehicles, IEEE Transactions on Intelligent Transportation Systems, vol. 17, No. 4, Apr. 2016, 1135-1145.

Riedmaier et al., Model Validation and Scenario Selection for Virtual-Based Homologation of Automated Vehicles, Applied Sciences, 11(35): 24 pages, Dec. 23, 2020.

Fremont et al., Formal Scenario-Based Testing of Autonomous Vehicles: From Simulation to the Real World, 2020.

International Search Report mailed in PCT/US2022/073251 dated Sep. 22, 2022.

International Search Report mailed in PCT/US2022/073252 dated Oct. 3, 2022.

U.S. Appl. No. 17/387,922, filed Jul. 28, 2021, Method and System for Developing Autonomous Vehicle Training Simulations.

International Search Report and Written Opinion dated May 15, 2023 for PCT/US2023/060394, 15 pages.

* cited by examiner

METHOD AND SYSTEM FOR DEVELOPING AUTONOMOUS VEHICLE TRAINING SIMULATIONS

BACKGROUND

Many vehicles today, including but not limited to autonomous vehicles (AVs), use motion planning systems to decide, or help the driver make decisions about, where and how to move in an environment. Motion planning systems rely on artificial intelligence models to analyze moving actors that the vehicle sensors may perceive, make predictions about what those actors may do, and select or recommend a course of action for the vehicle that takes the actor's likely action into account.

To make predictions and determine courses of action, the vehicle's motion planning model must be trained on data that the vehicle may encounter in an environment. The more unique scenarios that are used to train a vehicle's motion planning model, the better that the model can be at making motion planning decisions. However, the range of possible scenarios that a vehicle may encounter is limitless. Manual development of a large number unique simulation scenarios would require a significant investment in time and manpower, as well as a continued cost to update individual scenarios as the motion planning model improves and vehicle behavior changes.

While systems are available to randomly develop simulation scenarios, the number of possible random scenarios is limitless. Purely random simulation would require the motion planning model to consider an extremely large number of events that may not be relevant, or which at least would be extremely unlikely in, the real world. This causes a significant waste of computing resources and time. In addition, it can require the vehicle to being trained on a large number of less relevant scenarios well before the random process yields more relevant scenarios.

Therefore, methods of identifying and developing an effective set of relevant simulation scenarios, and training the vehicle's model on such scenarios, is needed.

This document describes methods and systems that address issues such as those discussed above, and/or other issues.

SUMMARY

In a first set of embodiments, a method of generating a vehicle motion planning model simulation scenario is disclosed. The method may be embodied in computer programming instructions and/or implemented by a system that includes a processor. The method includes receiving, from a data store containing multiple simulation scenarios, a base simulation scenario that includes features of a scene through which a vehicle may travel. The method also includes defining an interaction zone in the scene, wherein the interaction zone includes elements of position and time in the scene. The method also includes generating an augmentation element that includes an object and a behavior for the object. The method also includes adding the augmentation element to the base simulation scenario at the interaction zone to yield an augmented simulation scenario. The method also includes applying the augmented simulation scenario to an autonomous vehicle motion planning model in which the motion planning model: (i) simulates movement of the vehicle along a planned trajectory; (ii) in response to a perception system of the vehicle detecting the augmentation element, selects a continued trajectory for the vehicle, wherein the continued trajectory is either the planned trajectory or an alternate trajectory; and (iii) causes the vehicle to move along the continued trajectory in the augmented simulation scenario. Optionally, the method further includes using the trained motion planning model to generate a trajectory for the vehicle.

In some embodiments, defining the interaction zone may include receiving a user specification of the interaction zone via a user interface. In addition or alternatively, defining the interaction zone may include simulating movement of the vehicle along a planned trajectory in the base simulation scenario and also, in response to identifying a trigger event while simulating the movement of the vehicle in the base simulation scenario, defining the interaction zone to include: (a) a position and time in the base simulation scenario that includes a location and time of the trigger event; (b) a position in the base simulation scenario that is a threshold distance ahead of a location the trigger event; or (c) a time in the base simulation scenario that is a threshold amount of time ahead of a time of the trigger event. The trigger event may be defined as one or more of the following situations, among others: (i) a position and time in the planned trajectory in which the vehicle will implement a lane change maneuver; (ii) a position and time in the planned trajectory in which the vehicle will implement a left turn or a right turn; (iii) a position and time in the planned trajectory in which the vehicle will enter an intersection; or (iv) a position and time in the planned trajectory in which the vehicle reaches a threshold distance from an intersection.

To identify the trigger event in the embodiments above, the system may receive a signal of intent from a motion planning system of the vehicle. In addition or alternatively, the system may identify the trigger event by identifying multiple candidate trigger events and filtering out any trigger events that have a route length that exceeds a specified value or a time that exceeds a specified time value.

In some embodiments, to add the augmentation element to the base simulation scenario, the system may position the object to at least partially interfere with the planned trajectory of the vehicle. If so, the continued trajectory may be an alternate trajectory that will keep the vehicle at least a threshold distance away from the object.

In various embodiments, the behavior may be one that a perception system of the vehicle is expected to find ambiguous in response to either: (a) the behavior corresponding to at least two candidate behaviors which are inconsistent with each other; or (b) the behavior being inconsistent with a class of the object. If the object is a vehicle, pedestrian, bicycle, or other actor, the behavior may be one that causes movement of the object and which, when taken, will cause the vehicle's motion planning model to react by selecting the alternate trajectory.

Optionally, the system may generate multiple augmentation elements across multiple segments of the interaction zone. If so, each of the segments may be assigned an element distribution with weights for one or more object classes or one or more behavior types. If so, then the system may use the element distribution to select the simulated behavior for the object in each of the augmentation elements.

In other embodiments, a vehicle motion planning model training system includes a processor, a data store of simulation scenarios, and a memory that stores programming instructions that are configured to cause the processor to train a vehicle motion planning model. The system will receive, from the data store, a base simulation scenario that includes features of a scene through which a vehicle may travel. The system will then generate an augmentation element that includes a simulated behavior for an object in the scene by: (i) accessing a data store in which behavior probabilities are mapped to object types to retrieve a set of behavior probabilities for the object; and (ii) applying a randomization function to the behavior probabilities to select the simulated behavior for the object. The system will add the augmentation element to the base simulation scenario to yield an augmented simulation scenario. The system will then apply the augmented simulation scenario to an autonomous vehicle motion planning model to train the motion planning model in which the augmented simulation scenario will: (a) simulate movement of the vehicle along a planned trajectory; (b) in response to a perception system of the vehicle detecting the augmentation element, select a continued trajectory for the vehicle, wherein the continued trajectory is either the planned trajectory or an alternate trajectory; and (c) cause the vehicle to move along the continued trajectory. Optionally, the system may use the trained motion planning model to generate a trajectory for the vehicle.

Optionally, in the embodiment above, when applying the randomization function to the behavior probabilities to select the simulated behavior for the object may include instructions to select the simulated behavior as one that will at least partially interfere with the planned trajectory of the vehicle. Then, to cause the vehicle to move along the continued trajectory in the augmented simulation scenario, the system may cause the vehicle to move along an alternate trajectory that will keep the vehicle at least a threshold distance away from the object in the scenario. To add the augmentation element to the base simulation scenario, the system may at least partially position the object in a lane that the planned trajectory will traverse.

In another option, when applying the randomization function to the behavior probabilities to select the simulated behavior for the object the system may select the simulated behavior as one that a perception system of the vehicle is expected to find ambiguous in that the perception system is expected to assign substantially equal likelihoods to the simulated behavior in response to the simulated behavior corresponding to at least two candidate behaviors which are inconsistent with each other.

In yet another option, when applying the randomization function to the behavior probabilities to select the simulated behavior for the object, the system may select the simulated behavior as one that a perception system of the vehicle is expected to find ambiguous in response to the simulated behavior being inconsistent with a class of the object.

In yet another option, when applying the randomization function to the behavior probabilities to select the simulated behavior for the object, the system may select the simulated behavior as one that will cause movement of the object and which, when taken, will cause the vehicle's motion planning model to react by selecting the alternate trajectory.

Optionally, in some embodiments the system also may generate multiple augmentation elements across multiple segments of an interaction zone. If so, each of the segments will be assigned an element distribution with weights for one or more object classes or one or more behavior types. Then, the system may use the element distribution to select the simulated behavior for the object in each of the augmentation elements.

BRIEF DESCRIPTION OF THE DRAWINGS

FIG. 1A illustrates example elements of a vehicle simulation scenario, while FIG. 1B illustrates a modified version of the simulation scenario of FIG. 1A.

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" (or "comprises") means "including (or includes), but not limited to." Definitions for additional terms that are relevant to this document are included at the end of this Detailed Description.

An autonomous vehicle (AV) software stack includes various software platforms which handle various tasks that help the AV move throughout an environment. These tasks include tasks such as perception, motion planning, and motion control. An AV stack may reside in a software repository (in the physical form of computer-readable memory) that is available to a vehicle's original equipment manufacturer (OEM) and/or to an OEM's suppliers. An AV stack also may be directly deployed on a vehicle. To be effective, before it is deployed on a vehicle an AV stack must be trained on multiple simulation scenarios. Training is a process that applies a simulation scenario definition to one or more the AV stack's systems so that the AV stack can process the simulation scenario and generate a response. Supplemental training also may be done after an AV stack is deployed on a vehicle, with additional simulation scenarios that will continue to improve the AV stack's operation and help the AV recognize and react to an increased variety of conditions when it encounters them in the real world.

Figure 1:
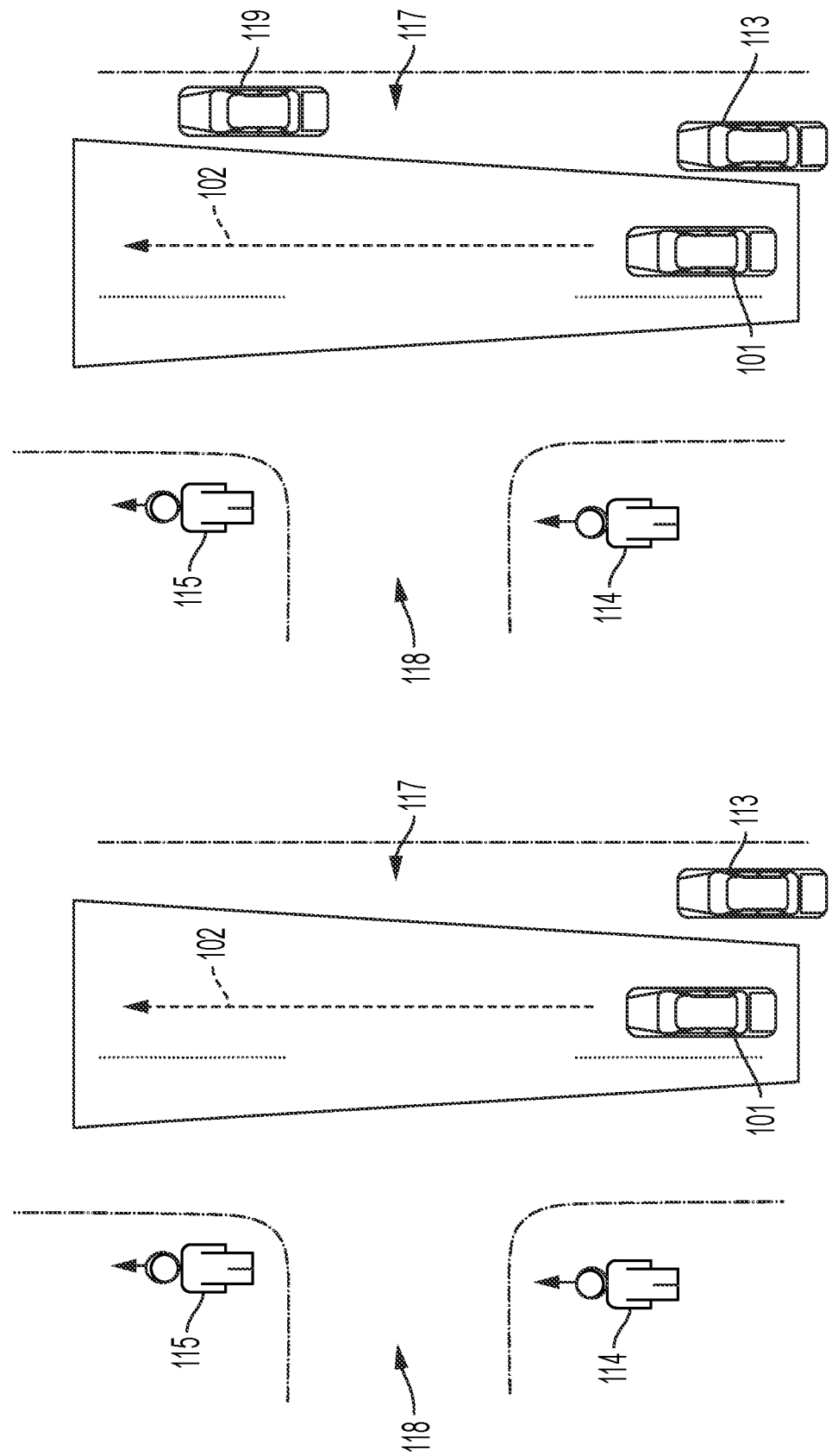

A simulation scenario definition is a set of parameters and/or programming instructions that identify one or more objects in a scene, the initial locations of the objects, and configurations for the objects such as acceleration profiles or other profiles that guide the actor's possible movements in the scene. Some objects may be actors that are moving or which could move, such as vehicles, pedestrians or animals. Other objects also may be static objects that can occlude the field of view of the AV's perception system, such as vegetation or buildings. FIG. 1A is a graphic illustration of an example simulation scenario for a vehicle 101 that is moving along a first street 117 according to a planned trajectory 102 past an intersection with a second street 118. The simulation scenario definition includes actors that are a parked vehicle 113 and pedestrians 114 and 115. The configuration for parked vehicle 113 may define that the vehicle is not currently moving, but that it could start to move forward and/or into the vehicle's lane. The configuration for pedestrian 114 may define that the pedestrian is moving parallel to first street 117 and toward second street 118, and that it is equally likely to cross either the first street 117 or the second street 118 when it reaches the intersection. The configuration for pedestrian 115 may define that the pedestrian is moving parallel to first street 117, and that it has a higher probability of continuing to move forward than it is to turn and cross the first street 117. The simulation scenario of FIG. 1A may be stored in a training system database for use in training one or more subsystems of an AV stack.

This document describes methods and systems for augmenting base simulation scenarios such as that shown in FIG. 1A by introducing one or more variations into the base scenario. The variation may include introducing one or more new actors into the base scenario, varying the configuration for one or more of the actors that already exist in the scenario, or both. For example, FIG. 1B shows a variation of the simulation scenario of FIG. 1A in which an additional actor—in this case parked car 119—is added to the scene. A training system may store and use an augmented simulation scenario such as that of FIG. 1B, in addition to the base scenario of FIG. 1A, to train the AV stack.

Figure 2:
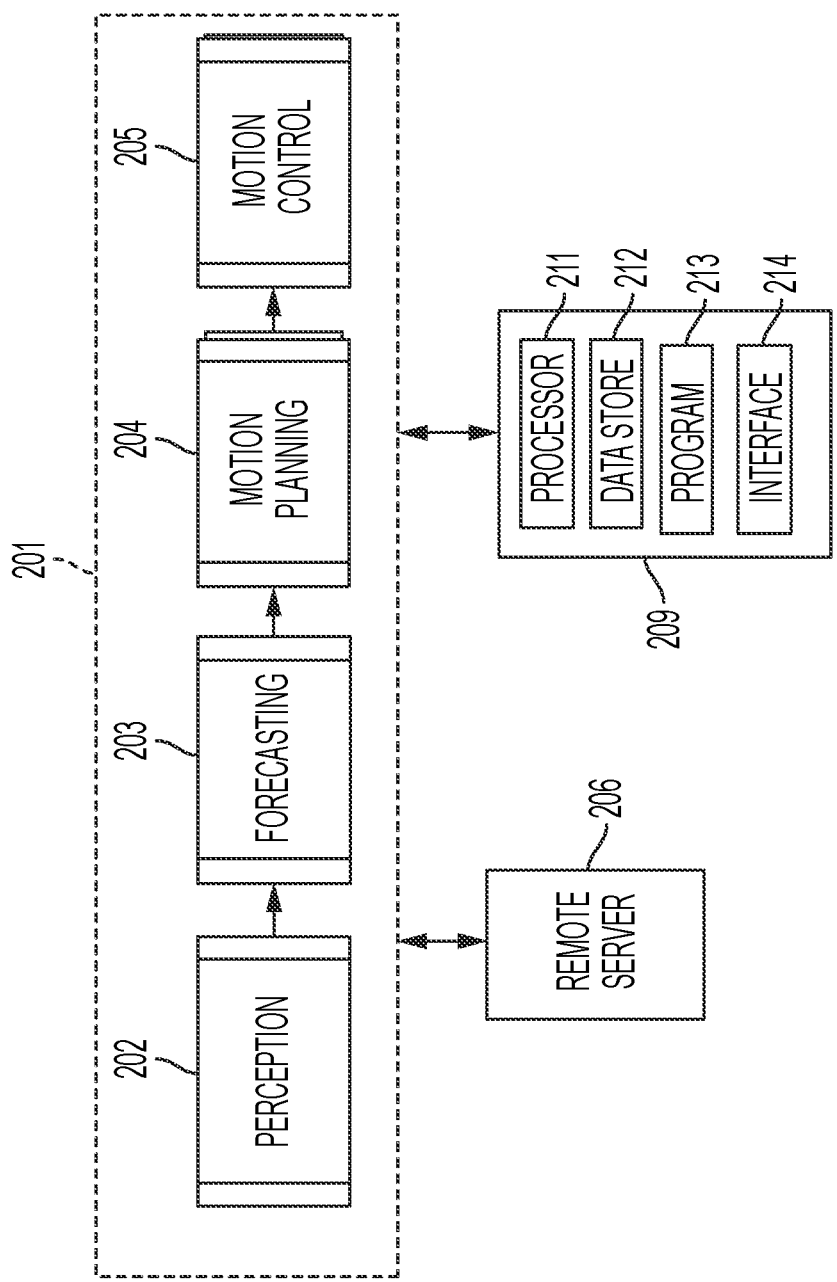
FIG. 2 illustrates example subsystems of an autonomous vehicle.

Before further exploring the details of the present embodiments, we provide some background information about AV systems. FIG. 2 shows a high-level overview of subsystems of an AV stack that may be relevant to the discussion below. Certain components of the subsystems may be embodied in processor hardware and computer-readable programming instructions that are part of a computing system 201 that is either onboard the vehicle or that is offboard and stored on one or more memory devices. The subsystems may include a perception system 202 that includes sensors that capture information about moving actors and other objects that exist in the vehicle's immediate surroundings. Example sensors include cameras, LiDAR sensors and radar sensors. The data captured by such sensors (such as digital image, LiDAR point cloud data, or radar data) is known as perception data. The perception data may include data representative of one or more objects in the environment.

The perception system may include one or more processors, and computer-readable memory with programming instructions and/or trained artificial intelligence models that, during a run of the AV, will process the perception data to identify objects and assign categorical labels and unique identifiers to each object detected in a scene. Categorical labels may include categories such as vehicle, bicyclist, pedestrian, building, and the like. Methods of identifying objects and assigning categorical labels to objects are well known in the art, and any suitable classification process may be used, such as those that make bounding box predictions for detected objects in a scene and use convolutional neural networks or other computer vision models. Some such processes are described in Yurtsever et al., "A Survey of Autonomous Driving: Common Practices and Emerging Technologies" (published in *IEEE Access*, April 2020).

The vehicle's perception system 202 may deliver perception data to the vehicle's forecasting system 203. The forecasting system (which also may be referred to as a prediction system) will include processors and computer-readable programming instructions that are configured to process data received from the perception system and forecast actions of other actors that the perception system detects.

The vehicle's perception system 202, as well as the vehicle's forecasting system 203, will deliver data and information to the vehicle's motion planning system 204 and motion control system 205 so that the receiving systems may assess such data and initiate any number of reactive motions to such data. The motion planning system 204 and motion control system 205 include and/or share one or more processors and computer-readable programming instructions that are configured to process data received from the other systems, compute a trajectory for the vehicle, and output commands to vehicle hardware to move the vehicle according to the determined trajectory. Example actions that such commands may cause include causing the vehicle's brake control system to actuate, causing the vehicle's acceleration control subsystem to increase speed of the vehicle, or causing the vehicle's steering control subsystem to turn the vehicle. Various motion planning techniques are well known, for example as described in Gonzalez et al., "A Review of Motion Planning Techniques for Automated Vehicles," published in *IEEE Transactions on Intelligent Transportation Systems*, vol. 17, no. 4 (April 2016).

The subsystems described above may be implemented as components of an AV stack, which may be trained on various simulation scenarios. As described above, the system 201 on which the subsystems may be installed may be a vehicle's computer processing hardware, or it may be one or more memory devices that are offboard the vehicle. The system 201 may be in communication with a remote server 206 that provides updates and/or commands, or which receives data from the AV stack. In addition, in the present embodiments, the system 201 on which the AV stack is installed will be in electronic communication with a training system 209. The training system 209 will include a processor 211, a data store 212 containing a variety of stored simulation scenarios, and a memory containing programming instructions 213 for generating, modifying and using simulation scenarios to train the system 201.

Optionally, the training system 209 also may include a user interface 214 for presenting information to a user and receiving information and/or commands from the user. For example, the user interface 214 may include a display via which the system may output graphic illustrations of simulation scenarios, as well as one or more menus that present features or options for augmenting the scenario. The user interface also may include an input device such as a mouse, keyboard, keypad, microphone and/or touch-screen elements of the display via which the issuer may select variations for a displayed scenario. The variations may include new actors, configuration parameters for new or existing actors, or other information.

Figure 3:
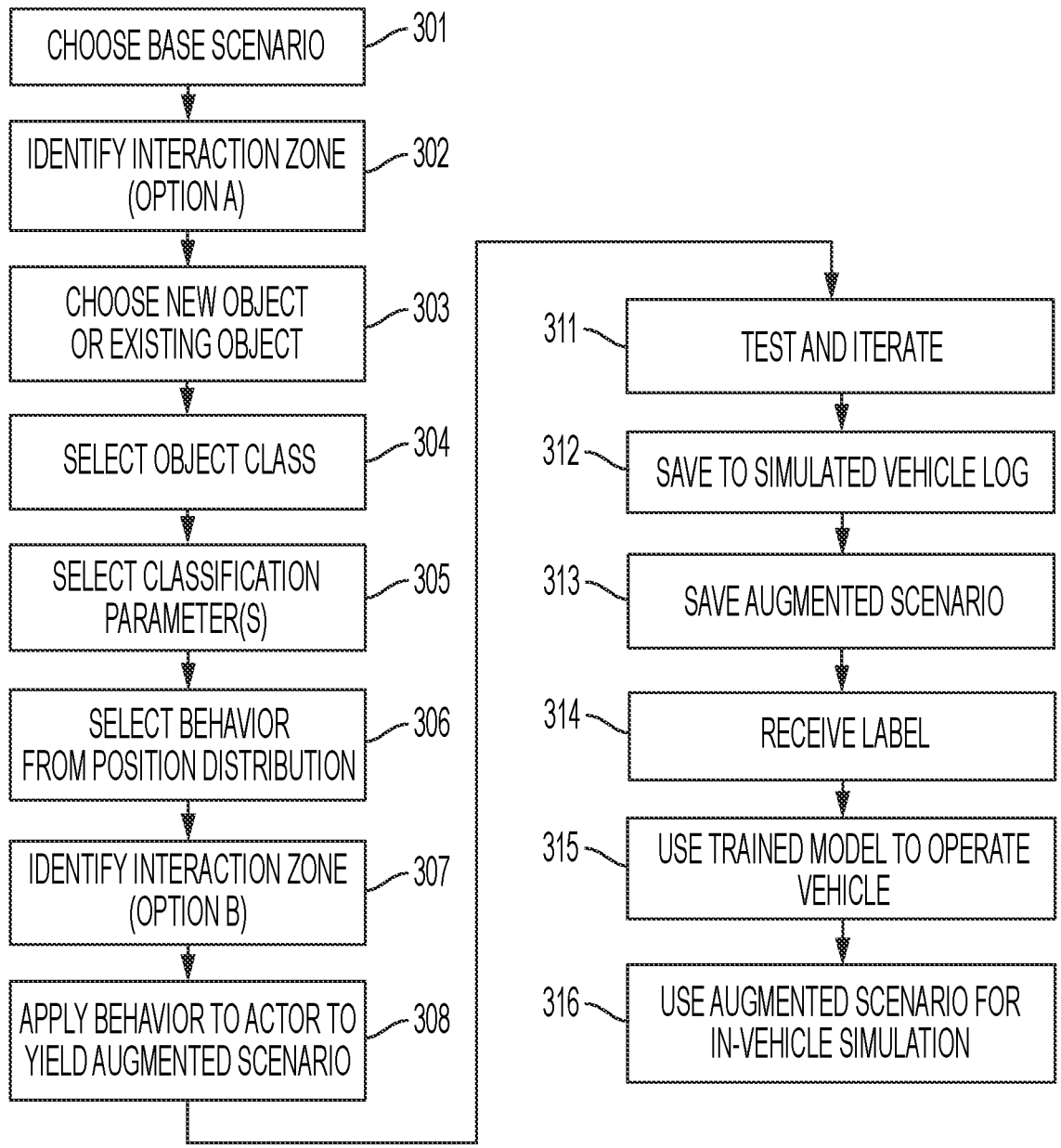
FIG. 3 is a flowchart that illustrates a process by which a training system may generate an augmented simulation scenario.
Figure 4:
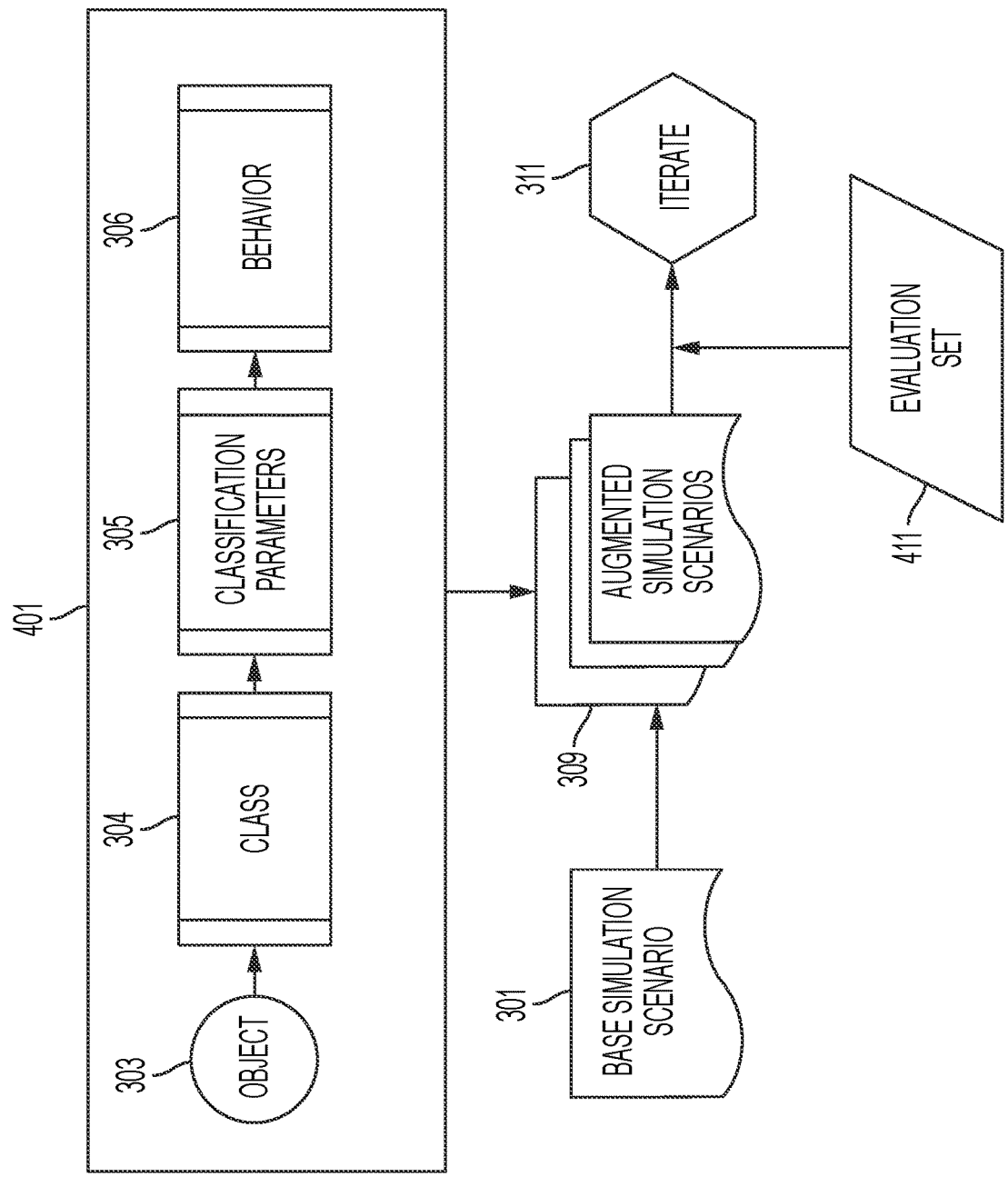
FIG. 4 illustrates certain elements of the process of FIG. 3 in an alternate format.

FIG. 3 is a flowchart that illustrates a process by which a training system (such as system 209 in FIG. 2) may generate an augmented simulation scenario for training an AV stack. FIG. 4 illustrates certain elements of the process in an alternate format. Referring to FIGS. 3 and 4, at 301 the system will choose a base simulation scenario from its set of stored simulation scenarios. Simulation scenarios may include data obtained from actual runs of vehicles in the real world, data generated through manual or automated simulation processes, or both. The system may select the base simulation scenario be done in response to a user input received via a user interface. Alternatively, the selection may occur automatically through processes such as random selection, by choosing the next scenario in a ranked order, or by applying a rule set such as one that selects a base scenario that satisfies one or more conditions. The system will then generate an augmentation element for the simulation scenario at 401. Generation of the augmentation element includes various sub-processes as described below.

Optionally, the sub-processes may include identifying an interaction zone within the base simulation scenario (step 302). An interaction zone is a time and distance range in the base simulation scenario into which the system will introduce an augmentation element. The interaction zone may include a physical location in the scene, a time in the simulation, or both a physical location and time. The locations and times may be specific points or ranges. In some embodiments, the system may identify the interaction zone as that which a user enters via a user interface. In others, the system may automatically choose the interaction zone based on one or more rules. Example rules may include rules to select a time and/or position that satisfies one or more conditions, such as:
- a position that is at or within a threshold distance from an intersection;
- a time range and position along which the vehicle will make a lane change; or
- a time range and position along which the vehicle will make a protected or unprotected left turn or right turn at an intersection.

Figure 6:
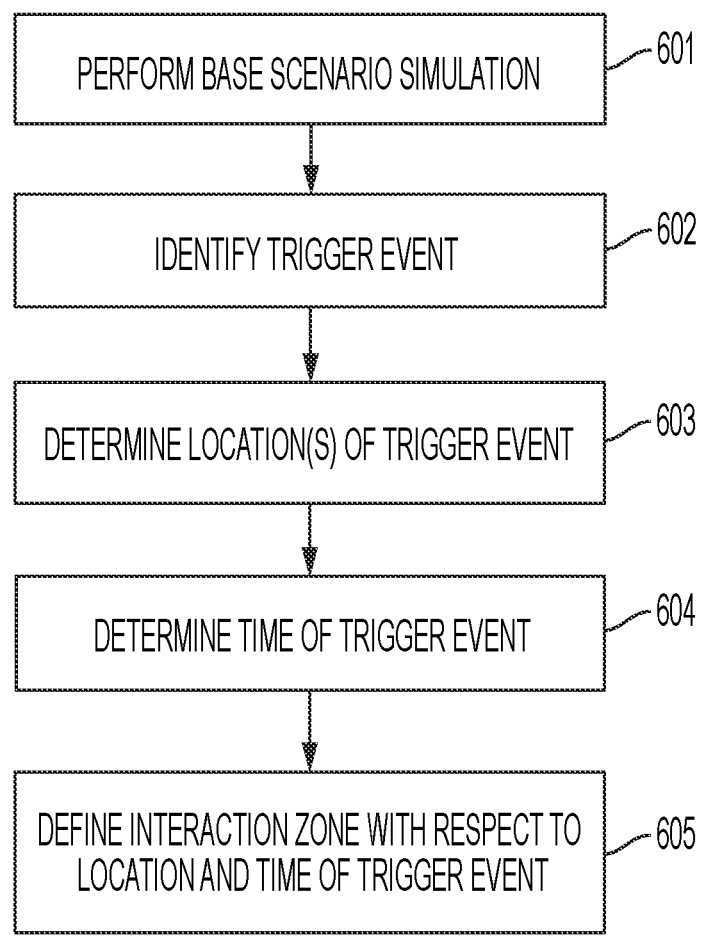
FIG. 6 is a flowchart that illustrates a process by which a training system may identify interaction zones within which the system may modify a base simulation scenario.

Additional aspects of the interaction zone selection process will be described below in the context of FIG. 6.

At 303 the system will choose whether to add a new object to the scene or modify the behavior of an existing actor in the scene. This choice may be received: (a) from a user via the user interface; (b) automatically and randomly; or (c) automatically based on one or more rules. If received via the user interface, the choice may be received in response to a set of options that the system outputs to the user via the user interface. If the system identified an interaction zone at 302 and if the simulation scenario does not include any suitable object within the interaction zone, the system may require that the choice be a new object, as no existing object whose behavior can be modified will be available in the interaction zone.

If the choice at 303 is to select a new object, or if the choice at 303 is to modify behavior of an existing object and multiple candidate objects are available, then at 304 the system may select an object class to employ in the augmentation element. Example object classes may include, for example, pedestrian, vehicle, cyclist, vegetation, building and/or other object classes. If the choice at 303 was to modify the behavior of an existing object, then the candidate object classes for selection may be limited to those present in the scene (or in the interaction zone, if applicable.) The selection of object class at 304 may be: (a) received from a user via the user interface; (b) automatically and randomly selected by the system; or (c) automatically selected by the system based on one or more rules. If received via the user interface, the choice may be received in response to a set of options that the system outputs to the user via the user interface.

Once the object class is selected, at 305 the system may select one or more classification parameters for the selected object class. Classification parameters are type labels for each object class. The system may store the type labels in a data store along with a mapping of each type to a probability that the object will be one that corresponds to the type. For example, for the "vehicle" object class, the system may store type labels and mapped probabilities that include [sedan, 0.8] and [truck; 0.2]. (In practice, the system would maintain several additional type labels for this class.) The system will then use the probabilities to apply a weighted randomization function to select one of the available types. An example randomization function would be one that will calculate the sum of all the weights, choose a random number that less than the sum, and subtract each type's weight from the random number until the system finds a type for which the random number is less than that type's weight. Other randomization functions may be used, including functions that consider other parameters.

At 306 the system will select a behavior from a position distribution of candidate behaviors for the object type along with mapped likelihoods of each candidate behavior. For example, for an object that is a bus, which is a type of vehicle, the position distribution may be [static, 0.8] and [dynamic, 0.2]. The system may then use a randomization function as described above to select one of these behaviors and determine whether or not the bus will move in the simulation scenario. Behaviors may be dynamic behaviors, such as one or more characteristics of motion as described by way of example above. Alternatively, they may be static characteristics of the object, such as a size or position of an occlusion such as vegetation or a building. The system may select a single behavior or multiple behaviors to apply to an object in the augmented simulation scenario.

As noted above at step 302 in FIG. 3, the system may choose the interaction zone early in the process. However, if not done early in the process, then after the system selects the actor class, classification parameters and position distribution for the augmentation element, then at 307 after selecting the augmentation element (object and behavior) the system may then identify the interaction zone into which the augmentation element will be introduced, whether by adding a new actor or modifying behavior of an existing actor. Identification of the interaction zone in this step will be done according to any of the processes described above for step 302, or below.

Figure 5A:
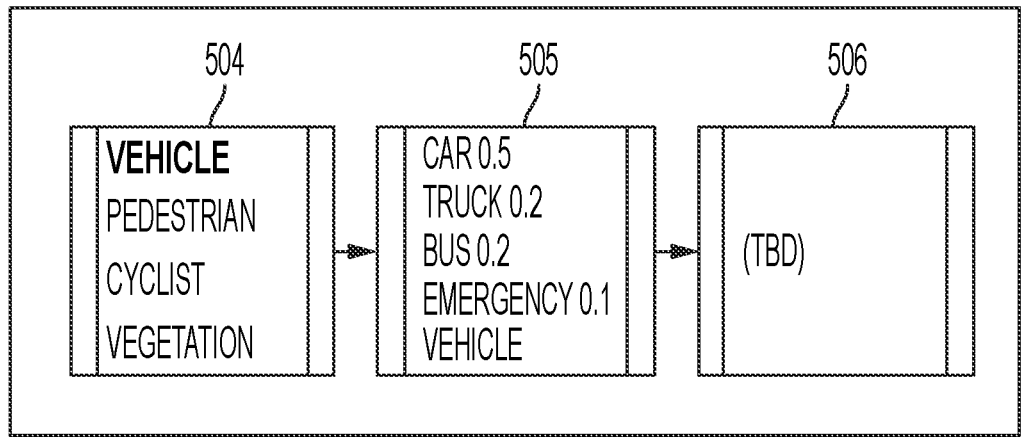
FIGS. 5A and 5B illustrate development of a simulation scenario augmentation using an example set of candidate object data.
Figure 5B:
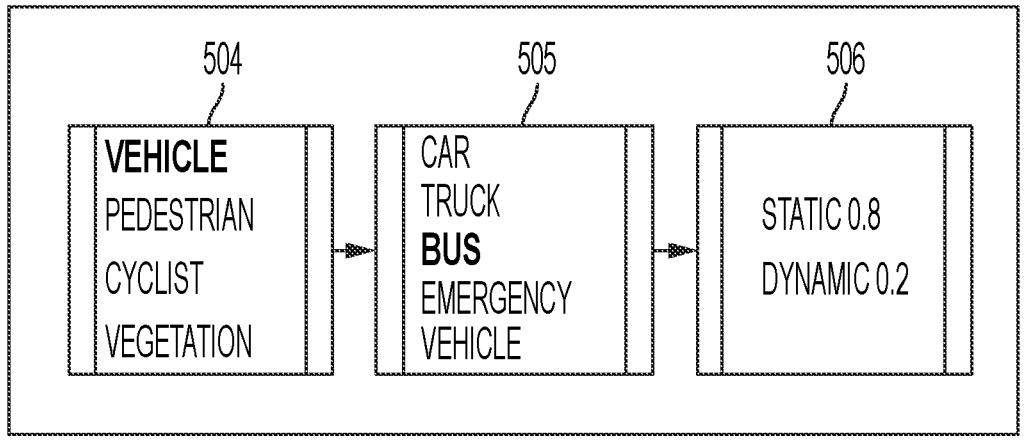

FIGS. 5A and 5B illustrate the steps of object class selection, classification parameter selection, and behavior selection using an example set of candidate actor data. In FIGS. 5A and 5B, the candidate object classes 504 are vehicle, pedestrian, cyclist and vegetation. FIG. 5A shows that in response to selecting the "vehicle" object class, the system then considers the classification parameters and mapped probabilities 505 of [car, 0.5], [truck, 0.2], [bus, 0.2] and [emergency vehicle, 0.1]. Position distributions are not yet known in FIG. 5A because they may vary depending on the classification parameter selected. However, FIG. 5B shows that after the system selects the "bus" classification parameter, the system may then consider the position distribution for behaviors and mapped probabilities 506 of [static, 0.8] and [dynamic, 0.2] for busses, and it may select one of those behaviors to apply to a bus in the augmentation element.

In practice, the system may add any number of additional classification parameters, behaviors, or both for any object class. For example, for additional sub-parameters of the "vehicle/car" class and parameter may include "parked car", which may be associated with various yaw range behaviors indicating not only whether the parked car will remain static or move, but also whether the vehicle is parallel to the lane of travel or skewed into the drivable area of the lane. The system may therefore determine any number of behaviors to apply to an object when modifying a base simulation scenario.

Returning to FIGS. 3 and 4, once the system generates the augmentation element for the simulation scenario at 401, the system will apply the augmentation element to the base simulation scenario to yield the augmented simulation scenario at 308. To apply the augmentation element, the system will add the object to, or (if it already exists) modify behavior of the object in, the base simulation scenario to include the selected behavior(s) for the specified object in the interaction zone. Other than adding the augmentation element, the system will leave the base simulation scenario relatively intact so that the training and assessment (discussed later) can focus on changes in vehicle reaction that the augmentation element may cause.

Once the system generates an augmented simulation scenario, at 311 the system may test the augmented simulation scenario by applying the augmented simulation scenario to the AV stack, optionally over multiple iterations and optionally with varied parameters. To test the augmented simulation scenario, the system will apply a planned trajectory of the vehicle to the scene in the augmented simulation scenario. The vehicle's perception system will detect the augmentation element in the simulation, and the vehicle's motion planning system will compute a continued trajectory response to the detected augmentation element. The continued trajectory may not change the trajectory, in which case it will cause the vehicle to continue along the planned trajectory in the simulation. Alternatively, the continued trajectory may be an alternate trajectory, such as one that will ensure that the vehicle avoids moving within a threshold distance of the object in the simulation. Optionally, in the iteration process at 311 the system may access an evaluation data set 411, which is a set of data describing an expected behavior for the vehicle in response to a simulation scenario. The expected behavior may be as simple as an expectation that the vehicle not collide with another object, or it may include other parameters such as acceleration and/or deceleration limits.

At 312 the system may save details of the simulation, including the augmentation element (object and behavior) and the vehicle's response (computed continued trajectory) to a simulated vehicle log for further analysis.

The system will then save the augmented simulation scenario to a data store at 313. The data store may be that which includes the base simulation scenario (in which case the augmented scenario may be used as a new base scenario in the future), a separate data store, or both.

Optionally, at 314 a human operator may label the vehicle's reaction in the simulation as a desirable reaction or an undesirable reaction to help train the AV's motion planning model. Alternatively, at 314 if system included an evaluation data set 411, the system may automatically label the vehicle's reaction as desirable or undesirable depending on whether the vehicle's simulated performance met the expected parameters that are contained in the evaluation data set. As yet another alternative, at 314 the system may help expedite and/or improve a human labeling process by extracting data from the evaluation data set 411 and using that data to suggest a label for the vehicle's reaction, in which case the human operator may either accept the suggested label or enter an alternative label. After the AV stack is trained with the augmented simulation scenario, the trained model may then be deployed in an AV to operate the vehicle at 315.

The process discussed above and illustrated in FIGS. 3 and 4 will be repeated for additional augmentation elements, thus allowing for a massive exploration of the state space by adding a wide variety of augmentation elements to a base simulation scenario while leaving the base scenario relatively intact. However, while the number of potential augmentation elements is potentially very large, the system limits processing requirements by restricting the addition of augmentation elements to those that appear in designated interaction zones. This allows the training process to be configurable to focus on particular scene characteristics that the operator of the training system selects, such as intersections, lane change events, left turns, or the like.

As noted above, either before or after selecting the augmentation element, the system will define an interaction zone in the base simulation scenario. The interaction zone includes elements of both position and time at which a new object will be inserted, or in which an existing object's behavior will be modified, to yield the augmented simulation scenario. The position of an interaction zone will typically be one that bears a relation to the vehicle's planned trajectory. For example, positions of an interaction zone may include lanes through which the vehicle's planned trajectory will travel, lanes that are within threshold distances of the vehicle's planned trajectory, sidewalks or crosswalks that are within threshold distances of the vehicle's planned trajectory, intersections that are present along the vehicle's planned trajectory, or other positions within the scene.

In some situations, the system may define the interaction zone as one that a user has specified via user input in a user interface. In some situations, the system may automatically define the interaction zone in a base simulation scenario using a process such as that described in FIG. 6. To automatically define the interaction zone, at 601 the system may perform a base simulation by simulating movement of the vehicle along a planned trajectory in the base simulation scenario. While doing this, the system will identify a trigger event at 602. A trigger event is an event of interest for which the system identifies, or which an operator of the system specifies, as a candidate for additional training data. Each trigger event will include a starting position and/or a starting time, and optionally an ending position and/or ending time. Trigger events may include, for example:

a position and time in the planned trajectory in which the vehicle will implement a lane change maneuver;

a position and time in the planned trajectory in which the vehicle will implement a left turn or a right turn;

a position and time in the planned trajectory in which the vehicle will enter an intersection; or a position and time in the planned trajectory in which the vehicle is approaching (i.e., reaches a threshold distance from) an intersection.

The system will make these determinations by receiving a signal of intent from the AV's motion planning system. The signal of intent is a communication from the motion planning system which identifies a motion that the AV plans to implement in the simulation.

In some situations, when identifying trigger events at 602, the system may identify multiple candidate trigger events and filter out any trigger events that do not meet one or more specified criteria, such as events having a route length or time that exceeds a specified value. In this way, the system can help create interaction zones that are a relatively small segment of the entire base simulation scenario. The filter also may remove trigger events for which the system has already generated a threshold number of augmentation elements. In this way the system can devote processing resources on trigger events that are most needed for motion planning model training, and avoid using processing resources to train the model on events for which the system already has at least a threshold among of training data.

At 603 the system will identify the position(s) of the trigger event (including for example starting position and ending position. At 604 the system will identify the time of the trigger event, which may be a single time or a time window that includes starting time and stopping time in the simulation scenario. (In this disclosure, "time" does not necessarily require determination of time according to a world clock in any particular time zone. Although world time may be used, "time" also may refer to a time position measured with respect to a start time of the simulation, a time measured by a computer clock, or another time.) In response to identifying the trigger event while simulating the movement of the vehicle in the base simulation scenario, at 605 the system will then define the interaction zone as a position (or positions) and time (or time window) that are determined with respect to the location and time of the trigger event. For example, the system may define interaction zone to: (a) equal the locations and times of the trigger event; (b) be a position range along the planned trajectory that includes the location of the trigger event and a time window that includes the time of the trigger event; (c) include a position (or position range) along the planned trajectory that begins a specified distance ahead of the location of the trigger event; or (d) include a time window in the simulation that begins a specified amount of time after the time of the trigger event. Other interaction zone definitions may be employed in various embodiments.

As noted above, an augmentation element will include an object and one or more behaviors for the object. Selection of the behaviors will introduce an element of randomness by selecting behavior elements as described above in the discussion of FIGS. 3 and 4, which helps the system be able to explore a very large state space and include events that may be rarely encountered in the real world. For behaviors of objects that are actors, in addition to simple behavior elements such as "remain static" or "be dynamic" (i.e., move), the system may define other behavior elements such as posture or pose, acceleration profile, and even "noise" elements that may be more difficult for the vehicle's perception system to discern such as presenting a vehicle with its right turn signal blinking while continuing to move straight through an intersection. These behaviors may include behavior definitions that follow base definitions of an obstruent augmentation element, an ambiguous augmentation element, a deviant augmentation element, or a behavior that corresponds to a combination of any of these. Features of these base definitions are described below.

Figure 7:
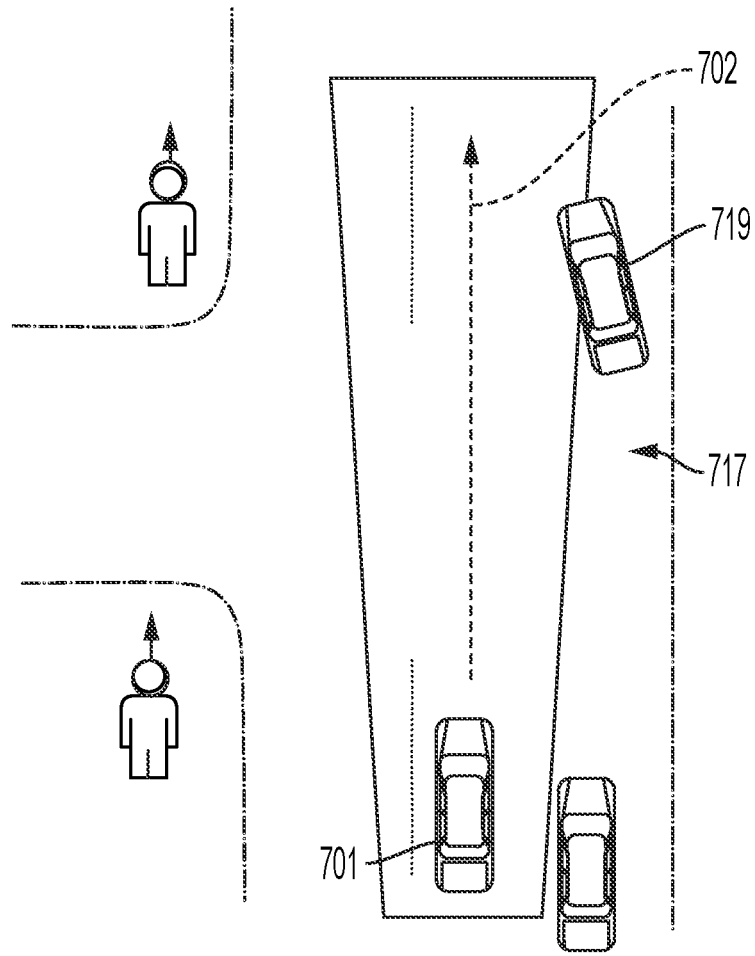
FIG. 7 illustrates an example augmented simulation scenario in which an obstruent object behavior has been introduced into the scenario.

An obstruent augmentation element is an object having a location that will at least partially block the vehicle's planned path. An example of this is shown in FIG. 7, in which vehicle 701 is moving on road 717 along a planned trajectory 702. Parked vehicle 719 is obstruent because its position is skewed, not parallel to the road, and therefore partially within a threshold distance from the centerline of the vehicle's planned trajectory 702. In the augmented simulation, when the vehicle's perception system detects the parked vehicle 719, the vehicle's motion planning system may alter the trajectory of vehicle 701 to: (a) veer slightly to the left to maintain a threshold distance between vehicle 701 and parked vehicle 719; and/or (b) to move more slowly as it approaches the parked vehicle 719 in case the parked vehicle begins motion and pulls into the lane in front of the vehicle 701. In various embodiments, an obstruent augmentation element may include any known object class, such as vehicle, pedestrian, cyclist, animal, vegetation, or even unknown/unidentifiable. The system may include a mapping for each object class with potential behaviors/states, along with probabilities of each behavior or state. By way of example, potential states of a vehicle may include parked, moving forward, turning left, turning right, accelerating, decelerating, among other states. Potential states of a pedestrian may include examples such as walking into lane, walking parallel to lane, standing facing lane, standing facing away from lane, among other states.

An ambiguous augmentation element is an object that exhibits a behavior or combination of behaviors that are not common for that class of object, and therefore a perception system of the vehicle will be expected to assign substantially equal likelihoods to the behavior being one of at least two candidate behaviors. (In this document, "substantially equal" means that the values of the two likelihoods are within 10 percent or less of each other.) Examples include a combination of behaviors that are inconsistent with each other, such as (i) a vehicle that exhibits a blinking turn signal while continuing to move straight through an intersection; (ii) a parked vehicle that exhibits a blinking turn signal while continuing to remain parked for more than a threshold period of time; or (iii) an object that randomly changes its classification from a first classification to a second classification (such as changing from pedestrian to unknown). Other examples include behaviors that are not associated with the class of object, such as vegetation that moves. Other examples include an object that flickers in and out of existence or that appears for no more than a limited number of cycles, in the simulation, or a vehicle that randomly activates and deactivates its brake lights. Each of these states may render one or more characteristics of the object ambiguous to the vehicle's perception system.

Figure 8:
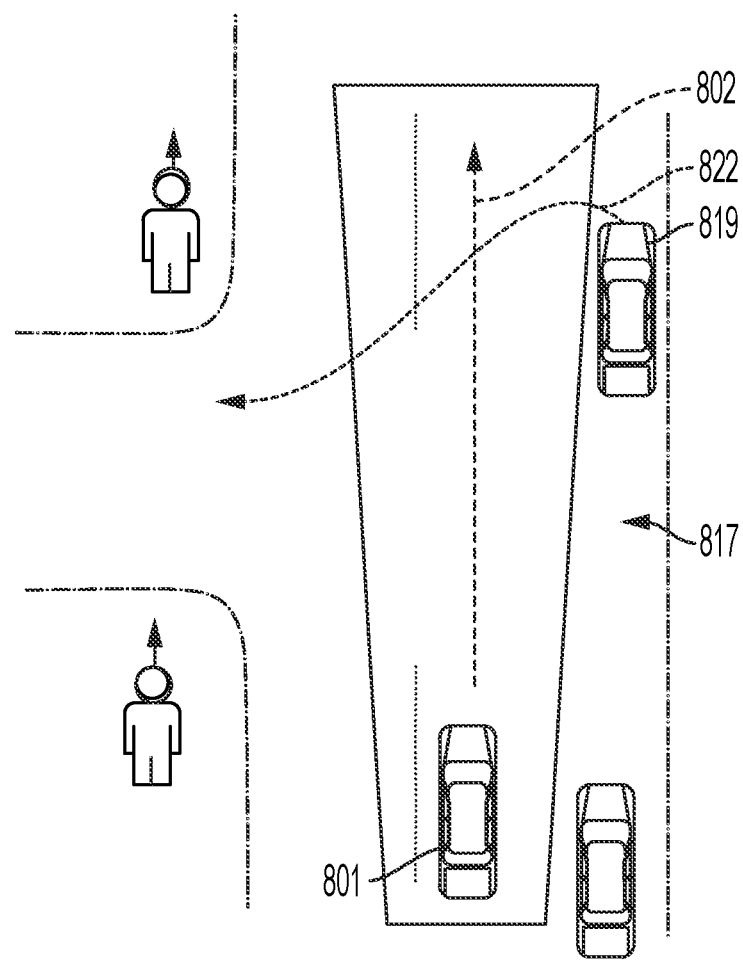
FIG. 8 illustrates an example augmented simulation scenario in which a deviant object behavior has been introduced into the scenario.

A deviant augmentation element is an object that exhibits a behavior or combination of behaviors that are both dynamic (i.e., it results in movement of the object) and which will cause the vehicle's motion planning system to react by modifying its trajectory. An example of this is shown in FIG. 8, in which vehicle 801 is moving on road 817 along a planned trajectory 802. Parked vehicle 819 is deviant because it pulls away from its position and moves not just forward, but it follows a trajectory 822 that crosses both the vehicle's planned trajectory 802 and the road 817. In the augmented simulation, when the vehicle's perception system detects the parked vehicle 819 begin to move along this deviant trajectory 822, the vehicle's motion planning system may alter the trajectory of vehicle 801 by causing the vehicle 801 to stop until the (formerly) parked vehicle 819 completely crosses the road 817, or to take other evasive action. Other deviant behaviors include, for example, motions that violate one or more traffic laws.

Figure 9:
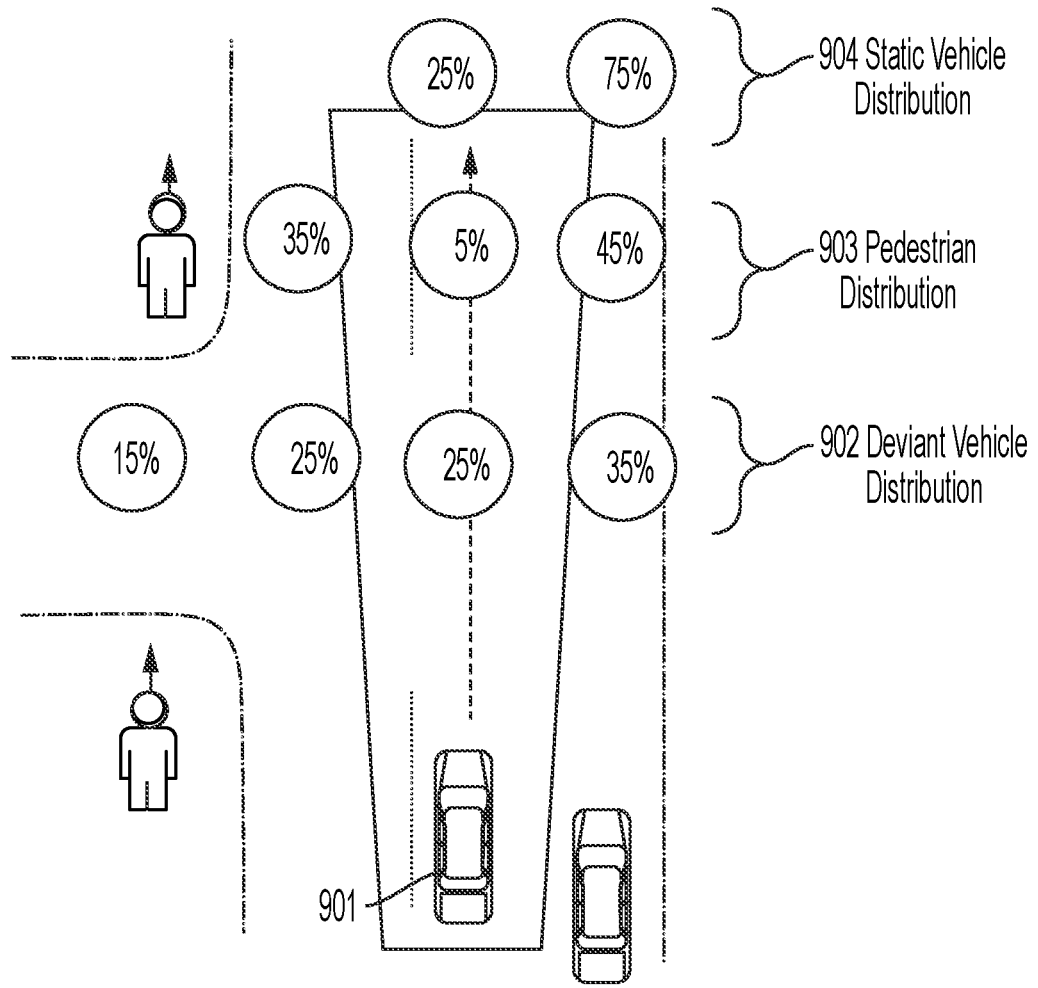
FIG. 9 illustrates how a system may incorporate element distributions into different segments of an interaction zone when generated multiple augmented simulation scenarios.

In some embodiments, the system may generate augmentation elements, and it may introduce different categories of augmentation elements within different segments of the interaction zone. Optionally, to promote random generation of augmentation elements in situations for which the system may require more data, the system may assign weights to different segments of the interaction zone. In addition, it may assign different weights to different categories of augmentation elements and/or different classes of objects in each segment. The system may then incorporate these distributions in its randomization function when generating objects and behaviors to use as augmentation elements. An example of this is shown in FIG. 9, in which the area in front of vehicle 901 include a first interaction zone segment 902 that includes four subregions that cross the road and extend into an intersecting road. Each subregion is assigned an object/behavior distribution which in this case may be a distribution for the placement of deviant vehicles in each subregion so that randomly generated deviant vehicle behaviors in the interaction zone segment are distributed across the subregions in amounts that are substantially equal to the distributions shown. The area also includes a second interaction zone segment 903 that includes three subregions that cross the road, and which in this case correspond to new pedestrian objects. Each subregion is assigned an object/behavior distribution which in this case may be a distribution for the placement of new pedestrians in each subregion so that randomly generated simulated pedestrians are distributed across the subregions in amounts that are substantially equal to the distributions shown. The area also includes a third interaction zone segment 904 that includes two subregions along road, and which in this case correspond to static vehicle locations (one in the lane of travel, and one in a parking lane). Each subregion is assigned an object/behavior distribution which in this case may be a distribution for the placement of new parked or otherwise non-moving vehicles in each subregion so that randomly generated simulated static vehicles are distributed across the subregions in amounts that are substantially equal to the distributions shown.

Finally, returning to FIG. 3, in some embodiments at 316 the system may deploy augmented simulation scenarios on-board the vehicle while the vehicle operates in a real-world environment such as a test track. In this case, referring to FIG. 2, the training system 209 may be onboard the vehicle, and it may deliver augmented simulation scenarios to the vehicle's forecasting system 203 and/or motion planning system 204. These systems will combine the combine data received from the vehicle's perception system 202 with the augmented simulation scenarios to expose the vehicle with additional scenarios that it may encounter in the real world but has not yet encountered. Example methods for combining real-world perception data with simulation data are described in U.S. patent application Ser. No. 17/074,807, the disclosure of which is fully incorporated into this document by reference.

The above-disclosed features and functions, as well as alternatives, may be combined into many other different systems or applications. Various components may be implemented in hardware or software or embedded software. Various presently unforeseen or unanticipated alternatives, modifications, variations or improvements may be made by those skilled in the art, each of which is also intended to be encompassed by the disclosed embodiments.

Terminology that is relevant to the disclosure provided above includes:

An "automated device" or "robotic device" refers to an electronic device that includes a processor, programming instructions, and one or more physical hardware components that, in response to commands from the processor, can move with minimal or no human intervention. Through such movement, a robotic device may perform one or more automatic functions or function sets. Examples of such operations, functions or tasks may include, without limitation, operating wheels or propellers to effectuate driving, flying or other transportation actions, operating robotic lifts for loading, unloading, medical-related processes, construction-related processes, and/or the like. Example robotic devices may include, without limitation, autonomous vehicles, drones and other autonomous robotic devices.

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" is a vehicle having a processor, programming instructions and drivetrain components that are controllable by the processor without requiring a human operator. An autonomous vehicle may be fully autonomous in that it does not require a human operator for most or all driving conditions and functions. Alternatively, it may be semi-autonomous in that a human operator may be required in certain conditions or for certain operations, or that a human operator may override the vehicle's autonomous system and may take control of the vehicle. Autonomous vehicles also include vehicles in which autonomous systems augment human operation of the vehicle, such as vehicles with driver-assisted steering, speed control, braking, parking and other advanced driver assistance systems.

The term "object," when referring to an object that is detected by a vehicle perception system or simulated by a simulation system, is intended to encompass both stationary objects and moving (or potentially moving) actors, except where specifically stated otherwise by use of the term "actor" or "stationary object."

When used in the context of autonomous vehicle motion planning, the term "trajectory" refers to the plan that the vehicle's motion planning system will generate, and which the vehicle's motion control system will follow when controlling the vehicle's motion. A trajectory includes the vehicle's planned position and orientation at multiple points in time over a time horizon, as well as the vehicle's planned steering wheel angle and angle rate over the same time horizon. An autonomous vehicle's motion control system will consume the trajectory and send commands to the vehicle's steering controller, brake controller, throttle controller and/or other motion control subsystem to move the vehicle along a planned path.

A "trajectory" of an actor that a vehicle's perception or prediction systems may generate refers to the predicted path that the actor will follow over a time horizon, along with the predicted speed of the actor and/or position of the actor along the path at various points along the time horizon.

In this document, the terms "street," "lane," "road" and "intersection" are illustrated by way of example with vehicles traveling on one or more roads. However, the embodiments are intended to include lanes and intersections in other locations, such as parking areas. In addition, for autonomous vehicles that are designed to be used indoors (such as automated picking devices in warehouses), a street may be a corridor of the warehouse and a lane may be a portion of the corridor. If the autonomous vehicle is a drone or other aircraft, the term "street" or "road" may represent an airway and a lane may be a portion of the airway. If the autonomous vehicle is a watercraft, then the term "street" or "road" may represent a waterway and a lane may be a portion of the waterway.

An "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions.

The terms "memory," "memory device," "computer-readable medium," "data store," "data storage facility" and the like each refer to a non-transitory device on which computer-readable data, programming instructions or both are stored. Except where specifically stated otherwise, the terms "memory," "memory device," "computer-readable medium," "data store," "data storage facility" and the like are intended to include single device embodiments, embodiments in which multiple memory devices together or collectively store a set of data or instructions, as well as individual sectors within such devices. A computer program product is a memory device with programming instructions stored on it.

The terms "processor" and "processing device" refer to a hardware component of an electronic device that is configured to execute programming instructions, such as a microprocessor or other logical circuit. A processor and memory may be elements of a microcontroller, custom configurable integrated circuit, programmable system-on-a-chip, or other electronic device that can be programmed to perform various functions. Except where specifically stated otherwise, the singular term "processor" or "processing device" is intended to include both single-processing device embodiments and embodiments in which multiple processing devices together or collectively perform a process.

A "machine learning model" or a "model" refers to a set of algorithmic routines and parameters that can predict an output(s) of a real-world process (e.g., prediction of an object trajectory, a diagnosis or treatment of a patient, a suitable recommendation based on a user search query, etc.) based on a set of input features, without being explicitly programmed. A structure of the software routines (e.g., number of subroutines and relation between them) and/or the values of the parameters can be determined in a training process, which can use actual results of the real-world process that is being modeled. Such systems or models are understood to be necessarily rooted in computer technology, and in fact, cannot be implemented or even exist in the absence of computing technology. While machine learning systems utilize various types of statistical analyses, machine learning systems are distinguished from statistical analyses by virtue of the ability to learn without explicit programming and being rooted in computer technology.

A typical machine learning pipeline may include building a machine learning model from a sample dataset (referred to as a "training set"), evaluating the model against one or more additional sample datasets (referred to as a "validation set" and/or a "test set") to decide whether to keep the model and to benchmark how good the model is, and using the model in "production" to make predictions or decisions against live input data captured by an application service. The training set, the validation set, and/or the test set, as well as the machine learning model are often difficult to obtain and should be kept confidential. The current disclosure describes systems and methods for providing a secure machine learning pipeline that preserves the privacy and integrity of datasets as well as machine learning models.

In this document, when relative terms of order such as "first" and "second" are used to modify a noun, such use is simply intended to distinguish one item from another, and is not intended to require a sequential order unless specifically stated.

In addition, terms of relative position such as "front" and "rear", or "ahead" and "behind", when used, are intended to be relative to each other and need not be absolute, and only refer to one possible position of the device associated with those terms depending on the device's orientation.

The invention claimed is:

1. A method of generating a vehicle motion planning simulation scenario, the method comprising, by a processor:
receiving, from a first data store containing a plurality of simulation scenarios, a base simulation scenario that includes features of a scene through which a vehicle may travel;
generating an augmentation element that comprises a simulated behavior for an object in the scene by:
accessing a second data store in which behavior probabilities are mapped to object types to retrieve a set of behavior probabilities for the object, and
applying a randomization function to the behavior probabilities to select the simulated behavior for the object;
adding the augmentation element to the base simulation scenario to yield an augmented simulation scenario; and
applying the augmented simulation scenario to an autonomous vehicle motion planning model to train the motion planning model in which the motion planning model:
simulates movement of the vehicle along a planned trajectory,
in response to a perception system of the vehicle detecting the augmentation element, selects a continued trajectory for the vehicle, wherein the continued trajectory is either the planned trajectory or an alternate trajectory, and
causes the vehicle to move along the continued trajectory.

2. The method of claim 1, wherein the method further comprises using the trained motion planning model to generate a trajectory for the vehicle.

3. The method of claim 1, wherein:
the simulated behavior for the object at least partially interferes with the planned trajectory of the vehicle; and
the continued trajectory is an alternate trajectory that will keep the vehicle at least a threshold distance away from the object.

4. The method of claim 3, wherein:
the object comprises a vehicle, a pedestrian, an animal, a bicycle, vegetation, or an unclassifiable object; and
adding the augmentation element to the base simulation scenario comprises at least partially positioning the object in a lane that the planned trajectory will traverse.

5. The method of claim 1, wherein the simulated behavior is one that a perception system of the vehicle is expected to find ambiguous in that the perception system is expected to assign substantially equal likelihoods to the simulated behavior in response to the simulated behavior corresponding to at least two candidate behaviors which are inconsistent with each other.

6. The method of claim 1, wherein the simulated behavior is one that a perception system of the vehicle is expected to find ambiguous in response to the simulated behavior being inconsistent with a class of the object.

7. The method of claim 1, wherein:
the object is a vehicle, pedestrian, bicycle, or other actor; and
the simulated behavior is one that causes movement of the object and which, when taken, will cause the vehicle's motion planning model to react by selecting the alternate trajectory.

8. The method of claim 1, further comprising:
generating a plurality of augmentation elements across a plurality of segments of an interaction zone in the scene, wherein each of the segments is assigned an element distribution with weights for one or more object classes or one or more behavior types; and
using the element distribution to select the simulated behavior for the object in each of the augmentation elements.

9. A computer program product comprising:
a memory that stores programming instructions that are configured to cause a processor to train a vehicle motion planning model by:
receiving, from a first data store containing a plurality of simulation scenarios, a base simulation scenario that includes features of a scene through which a vehicle may travel,
generating an augmentation element that comprises a simulated behavior for an object in the scene by:
accessing a second data store in which behavior probabilities are mapped to object types to retrieve a set of behavior probabilities for the object; and
applying a randomization function to the behavior probabilities to select the simulated behavior for the object;
adding the augmentation element to the base simulation scenario at the interaction zone to yield an augmented simulation scenario, and
applying the augmented simulation scenario to an autonomous vehicle motion planning model to train the motion planning model by, in the augmented simulation scenario:
simulating movement of the vehicle along a planned trajectory;
by the motion planning model, in response to a perception system of the vehicle detecting the augmentation element, selecting a continued trajectory for the vehicle, wherein the continued trajectory is either the planned trajectory or an alternate trajectory; and
causing the vehicle to move along the continued trajectory.

10. The computer program product of claim 9, further comprising additional programming instructions that are configured to cause the processor to use the trained motion planning model to generate a trajectory for the vehicle.

11. The computer program product of claim 9, wherein:
the instructions to apply a randomization function to the behavior probabilities to select the simulated behavior for the object comprise instructions to select the simulated behavior as one that will at least partially interfere with the planned trajectory of the vehicle; and
the instructions to cause the vehicle to move along the continued trajectory comprise instructions to cause the vehicle to move along an alternate trajectory that will keep the vehicle at least a threshold distance away from the object.

12. The computer program product of claim 11, wherein the instructions to add the augmentation element to the base simulation scenario comprise instructions to at least partially position the object in a lane that the planned trajectory will traverse.

13. The computer program product of claim 9, wherein the instructions to apply a randomization function to the behavior probabilities to select the simulated behavior for the object comprise one or more of the following:
instructions to select the simulated behavior as one that a perception system of the vehicle is expected to find ambiguous in that the perception system is expected to assign substantially equal likelihoods to the simulated behavior in response to the simulated behavior corresponding to at least two candidate behaviors which are inconsistent with each other;
instructions to select the simulated behavior as one that a perception system of the vehicle is expected to find ambiguous in response to the simulated behavior being inconsistent with a class of the object; or
instructions to select the simulated behavior as one that will cause movement of the object and which, when taken, will cause the vehicle's motion planning model to react by selecting the alternate trajectory.

14. The computer program product of claim 9, further comprising additional programming instructions that are configured to cause the processor to:
generate a plurality of augmentation elements across a plurality of segments of an interaction zone, wherein each of the segments is assigned an element distribution with weights for one or more object classes or one or more behavior types; and
when applying a randomization function to the behavior probabilities to select the simulated behavior for the object in each of the augmentation elements, use the element distribution to select the simulated behavior for the object.

15. A vehicle motion planning model training system, comprising:
a processor;
a first data store containing a plurality of simulation scenarios; and
a memory that stores programming instructions that are configured to cause the processor to train a vehicle motion planning model by:
receiving, from the first data store, a base simulation scenario that includes features of a scene through which a vehicle may travel,
generating an augmentation element that comprises a simulated behavior for an object in the scene by:
accessing a second data store in which behavior probabilities are mapped to object types to retrieve a set of behavior probabilities for the object; and
applying a randomization function to the behavior probabilities to select the simulated behavior for the object,
adding the augmentation element to the base simulation scenario at the interaction zone to yield an augmented simulation scenario, and
applying the augmented simulation scenario to an autonomous vehicle motion planning model to train the motion planning model by, in the augmented simulation scenario:
simulating movement of the vehicle along a planned trajectory;
by the motion planning model, in response to a perception system of the vehicle detecting the augmentation element, selecting a continued trajectory for the vehicle, wherein the continued trajectory is either the planned trajectory or an alternate trajectory; and
causing the vehicle to move along the continued trajectory.

16. The system of claim 15, further comprising additional programming instructions that are configured to cause the processor to use the trained motion planning model to generate a trajectory for the vehicle.

17. The system of claim 15, wherein:
the instructions to apply the randomization function to the behavior probabilities to select the simulated behavior for the object comprise instructions to select the simulated behavior as one that will at least partially interfere with the planned trajectory of the vehicle; and
the instructions to cause the vehicle to move along the continued trajectory comprise instructions to cause the vehicle to move along an alternate trajectory that will keep the vehicle at least a threshold distance away from the object.

18. The system of claim 15, wherein the instructions to add the augmentation element to the base simulation scenario comprise instructions to at least partially position the object in a lane that the planned trajectory will traverse.

19. The system of claim 15, wherein the instructions to apply the randomization function to the behavior probabilities to select the simulated behavior for the object comprise one or more of the following:
instructions to select the simulated behavior as one that a perception system of the vehicle is expected to find ambiguous in that the perception system is expected to assign substantially equal likelihoods to the simulated behavior in response to the simulated behavior corresponding to at least two candidate behaviors which are inconsistent with each other;
select the simulated behavior as one that a perception system of the vehicle is expected to find ambiguous in response to the simulated behavior being inconsistent with a class of the object; or
select the simulated behavior as one that will cause movement of the object and which, when taken, will cause the vehicle's motion planning model to react by selecting the alternate trajectory.

20. The system of claim 17, further comprising additional programming instructions that are configured to cause the processor to:
generate a plurality of augmentation elements across a plurality of segments of an interaction zone, wherein each of the segments is assigned an element distribution with weights for one or more object classes or one or more behavior types; and
when applying the randomization function to the behavior probabilities to select the simulated behavior for the object in each of the augmentation elements, use the element distribution to select the simulated behavior for the object.

* * * * *